Nov. 3, 1925. Re. 16,197

P. B. DELANY

SOUND REPRODUCING DEVICE

Original Filed Feb. 1, 1918 3 Sheets-Sheet 1

Inventor
Patrick B. Delany
by his Attorneys
Baldwin Wight

Nov. 3, 1925.

Re. 16,197

P. B. DELANY

SOUND REPRODUCING DEVICE

Original Filed Feb. 1, 1918 3 Sheets-Sheet 2

Inventor
Patrick B. Delany
by his Attorneys
Baldwin Wight

Nov. 3, 1925. Re. 16,197

P. B. DELANY

SOUND REPRODUCING DEVICE

Original Filed Feb. 1, 1918 3 Sheets-Sheet 3

Inventor
Patrick B. Delany
by his Attorneys
Baldwin & Wright

Reissued Nov. 3, 1925. Re. 16,197

UNITED STATES PATENT OFFICE.

PATRICK B. DELANY, OF SOUTH ORANGE, NEW JERSEY; JAMES H. DELANY EXECUTOR OF SAID PATRICK B. DELANY, DECEASED.

SOUND-REPRODUCING DEVICE.

Original No. 1,415,807, dated May 9, 1922, Serial No. 214,951, filed February 1, 1918. Application for reissue filed July 9, 1923. Serial No. 650,482.

*To all whom it may concern:*

Be it known that I, PATRICK B. DELANY, a citizen of the United States, residing at South Orange, in the county of Essex and State of New Jersey, have invented certain new and useful Improvements in Sound-Reproducing Devices, of which the following is a specification.

My invention relates generally to sound reproducing apparatus and more particularly to devices for electrically reproducing the sounds produced by a phonograph or the like in a distant telephone receiver.

I am aware that the telephonic transmission of phonographically reproduced sounds has been heretofore accomplished in various ways, each of which involves in one form or another some adaptation of the carbon microphone. Experience has proven that there are certain defects inherently present in apparatus in which microphones are included, the most important of which is the failure of the current flowing through the microphone to clearly and faithfully reproduce in pitch and quality the sounds intended to be transmitted. On the other hand the well-known characteristic of the microphone whereby it magnifies mere loudness results in an undue exaggeration of the extraneous noises produced by the scraping of the needle and the operation of the motor and other mechanical parts. These effects cannot be avoided where a microphone is used as a transmitter and, in addition, the action of mechanical vibration on the carbon granules of the transmitter also produces effects apart from those derived from the sound record. It follows that the microphone, from the nature of its construction, cannot be relied upon to reproduce a single, true tone sung into it, or to render the tone twice alike, owing to the fact that almost invariably the vibrations of the first tone will cause a rearrangement of the carbon granules which will vary the conductivity of the circuit in which the microphone is included. This will, of course, result in corresponding variation in the pitch and quality of the tone being rendered. In this way a single tone of a few seconds duration will be subject to a number of changes which will prevent its correct reproduction. The object of this invention is to provide a sound reproducing device of this general nature in which the disadvantages referred to are eliminated.

By experimentation I have found that for pure reproduction of musical sounds by telephone the transmitter should be of the magneto type, and that it is most efficient when connected to the tone arm or emitter channel of the machine, so that the iron diaphragm of the transmitter shall be vibrated directly by the sound vibrations passing through the arm or horn. The chief characteristics of magneto type transmitter are that it includes a diaphragm of magnetic material which is caused to vibrate by the action of sound waves in the magnetic field of a permanent magnet. A coil mounted on the magnet will, according to the well-known law relating to induction currents, have alternating current impulses generated therein, corresponding to the vibrations of the diaphragm, so that the magneto transmitter acts as a generator of electricity. As has been already indicated, it has been found that the currents are undulated by the vibratory approach and withdrawal of the diaphragm-armature of the magnet of the magneto electric generator. In the present case the currents thus generated almost perfectly represent in pitch and in quality the sounds striking the diaphragm and causes their reproduction in the corresponding receiver with remarkable clearness and distinctness.

Since the quantity of electricity generated by the magneto transmitter is of necessity comparatively small, this method of transmission would not be effective over great distances so that in this particular, as well as in those already referred to, the magneto transmitter is not the equivalent of the microphone, which does not generate electricity but, instead, acts in a manner analogous to the action of a valve and controls the flow of varying quantities of current from an outside source. This characteristic of the microphone makes it particularly useful where quantity and volume of sound is desired as in the loud-speaking announcers used in railway stations and other public places, a function not contemplated in this invention. The object herein sought is rather the refined and accurate reproduction of musical and other sounds within the comparatively restricted boundaries of a town, or from one room of a dwelling or other building to another. In homes, hospitals and sanitariums where invalids, especially those suffering from nervous troubles, could not endure the blare and action of music produced immediately in their presence, would derive grateful entertainment and much beneficial mental abstraction from their real or imaginary ailments. A small telephone receiver of the watch-case type connected by flexible conducting cord to the telephone transmitter mounted on the tone arm of a phonograph playing in a distant room would afford even a bed ridden invalid the opportunity of listening to the instrument without being subjected to the excitement or embarrassment of direct association with other people.

It will be evident that the advantages of a system of this kind may be had in other situations than the particular ones named. For instance, music dealers will be enabled to permit their customers to listen over the telephones in their own homes to the playing of records in the dealer's shop. This can be effected by hanging the small receiver of the apparatus over the mouthpiece of the telephone transmitter in the shop, so that the customer can judge of the merits of the record being played, through the receiver at his end of the regular telephone circuit. The presence of the carbon microphone transmitter in the telephone circuit, with such an arrangement, does not have the harmful influence on the rendering of musical tones that it would have if mounted directly on the tone arm in the local circuit, where it would be subjected to mechanical vibration, as already pointed out. As a result, the reproduction of the sounds, even through the intermediary of an ordinary telephone circuit containing a carbon microphone transmitter, is faithful and agreeable. Other features of the invention will be hereinafter described.

Figure 1:
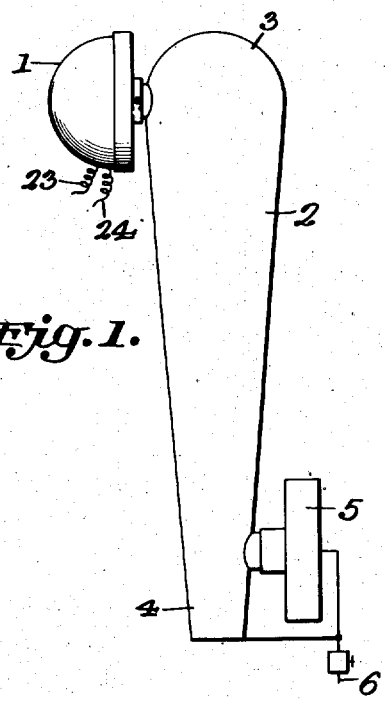
Figure 1 is a view showing an embodiment of the invention in which the magneto transmitter is directly mounted on the tone arm of a suitable sound reproducing instrument.

In Figure 1 of the drawing there is shown a preferred embodiment of the invention in which a telephone transmitter 1 of the magneto-instrument type is mounted on the tone arm 2 of any suitable sound reproducing device such as a phonograph or the like. Preferably the transmitter 1 is mounted adjacent the enlarged end 3 of the tone arm in order to secure the greatest possible amplitude of vibration of the transmitter diaphragm through the action thereon of the vibrating column of air in the progressively expanding tubular tone arm 2. Carried at the smaller end 4 of the tone arm is a sound box 5 of any suitable type and adapted to be operated through the engagement of the stylus 6 with the record groove of the sound record in the usual manner.

Figure 3:
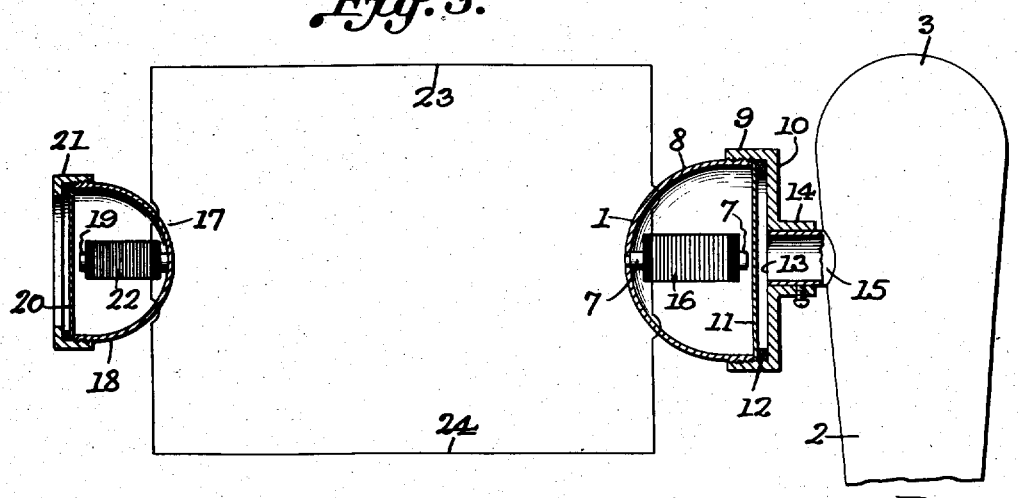
Figure 3 is a detailed view of the magneto transmitter included in circuit with a telephone receiver.

The specific construction of the transmitter 1 is best shown in Figure 3 in the form of a watch-case type of instrument having a permanent magnet 7 mounted in direct contact with the bowl-shaped frame member 8 of magnetic material and externally threaded for engagement with the flange 9 of the supporting member 10. A diaphragm 11 is adapted to be placed against the edge of the frame member 8 and to be forced against a suitable gasket 12 by turning the member 8 into place. The diaphragm 11 when so mounted bears a cooperative relation to the adjacent pole of the magnet, as will be seen. The supporting member 10 is provided with an opening 13 surrounded by a flange 14 which is adapted to be slipped into place on a corresponding flange 15 formed about the edge of an opening in the side of the tone arm 2. It will be seen that vibrations set up in the air column within the tone arm by the mechanical vibration of the diaphragm in the sound box 5 will be communicated directly to the diaphragm 11 of the transmitter 8.

It will be obvious that the movement of the vibrating diaphragm in the magnetic field of the permanent magnet 7 will induce undulating current fluctuations in a coil 16 on the magnet 7. In order to utilize the current thus produced, a telephone receiver 17 is provided, preferably of the same watch-case type construction shown in the make-up of the transmitter 1, that is, a metallic frame member 18 is provided with a permanent magnet 19 and a diaphragm 20 mounted in cooperative relation thereto. A flange member 21 serves to hold the diaphragm 20 in place and is adapted to be held to the ear of a person desiring to hear the reproduction in the receiver. A coil 22 mounted on the magnet 19 is electrically connected to the coil 16 of the transmitter 1 through the conductors 23 and 24. I have found that this type of apparatus perfectly reproduces the sounds produced by the record without any deterioration in pitch or quality, in striking contrast to the results attained by the microphonic devices heretofore used for this purpose.

Figure 2:
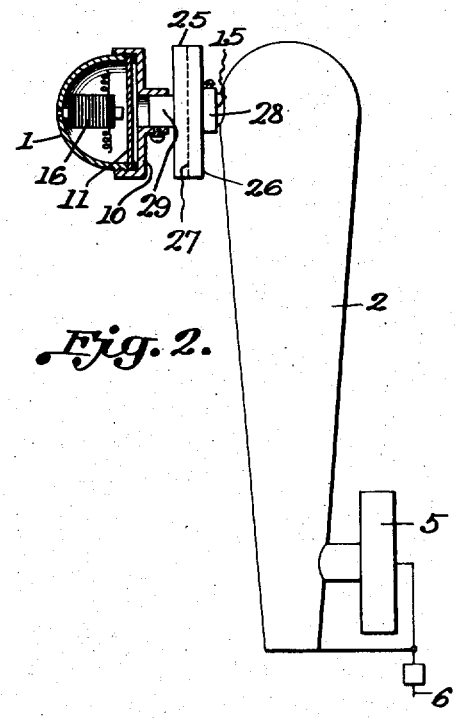
Figure 2 shows an embodiment of the invention in which the transmitter is mounted on an auxiliary sound box carried by the tone arm.

In Figure 2 of the drawing is shown a modification in which a supplemental sound box 25 is interposed between the tone arm 2 and the transmitter 1. The sound box 25 comprises a diaphragm chamber 26 in which is mounted a diaphragm 27 either of a metallic or non-metallic type. A supplemental sound box of this type is shown in my Patent No. 1,202,973, Oct. 31, 1916. By this arrangement the transmitter diaphragm is actuated by air vibrations set up in the auxiliary sound box by the action of the diaphragm 27 therein. Such auxiliary devices have been found to greatly improve the primary reproduction in the ordinary phonograph. The diaphragm chamber 26 is provided with a flange 28, adapted to fit on the flange 15 of the tone arm, and also with a flange 29 adapted to fit into the flange 14 on the transmitter 1, in an obvious manner.

Figure 4:
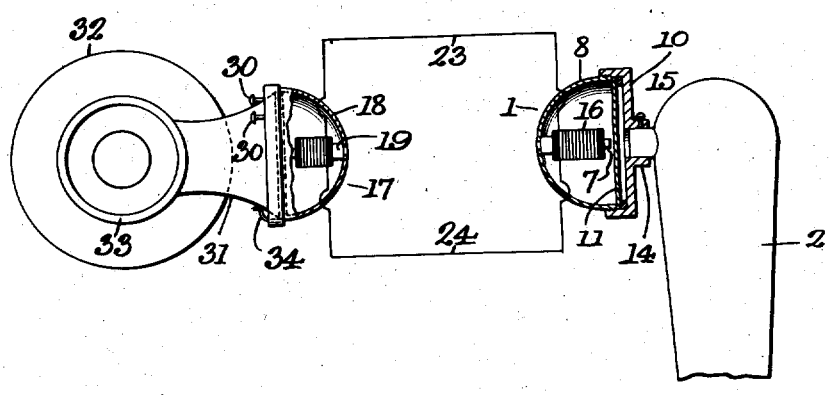
Figure 4 is a view similar to Figure 3 and showing the receiver in the local circuit mounted on the mouthpiece of a telephone transmitter to reproduce sounds at a distance.

In Figure 4 is shown an arrangement by means of which the sounds reproduced in the receiver 17 can be re-transmitted over an ordinary telephone circuit. In order to effect this the receiver 17 is fitted with suitable headed attaching pins 30 by means of which the receiver can be placed in position with the diaphragm thereof facing the diaphragm of a telephone transmitter. Although the receiver 17 can be placed in position on the single mouthpiece of an ordinary telephone transmitter, I preferably employ in combination therewith a double mouthpiece, one of the mouthpieces 33 being arranged for speech transmission in the ordinary way and the mouthpiece 31 being adapted to receive the receiver 17. I find it advantageous to provide the receiver 17 with a spring clip 34 at the lower edge, which with the pins 30 serves to hold the receiver in place on the mouthpiece of the transmitter.

Figure 5:
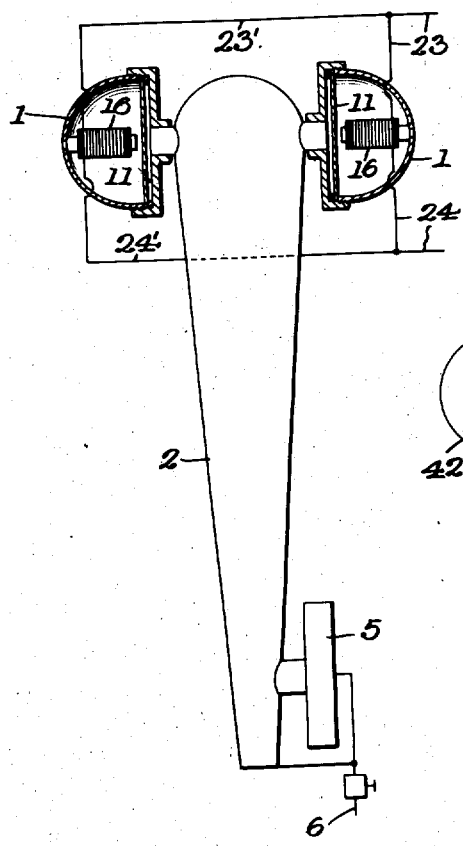
Figure 5 is a view showing the use of two magneto transmitters mounted on a common tone arm and connected in parallel in the same local circuit.

In Figure 5 is shown a modification of the invention in which two transmitters are mounted on the tone arm and in which a supplemental pair of conductors 23′ and 24′ are used to connect the two transmitters in parallel with the same receiver. An arrangement such as this is useful in situations where more powerful qualities are required in the reproduced sounds than are characteristic of the sounds produced by the single transmitter shown in the remaining views.

Figure 6:
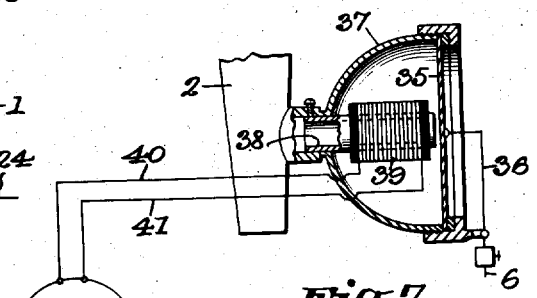
Figure 6 is a view showing a magneto transmitter and sound box combined into a single device.

In Figure 6 is shown a modification in which the sound box of the reproducing instrument and the telephonic transmitter are combined into a single device. To bring this about, the sound box diaphragm 35, instead of being non-magnetic in character as in the ordinary phonograph, is made of magnetic material and the needle or stylus 6 is connected through the diaphragm actuating lever 36 with a central portion of the diaphragm 35. A frame member 37 serves to form a diaphragm chamber and to support the diaphragm 35 and tubular member 38 which is permanently magnetized. It will be seen that the tubular member 38 not only serves to convey sound waves from the diaphragm into the tone arm 2, but that it also serves to induce current impulses in the coil 39 and, by way of the circuit formed by the conductors 40 and 41, reproduce sounds in the receiver 42.

Figure 7:
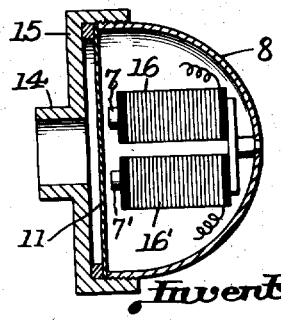
Figure 7 is a view of a modified form of transmitter in which a double pole magnet is employed.

In Figure 7 is shown a type of transmitter in which a double pole magnet has the cores 7 and 7′ and the coils 16 and 16′. Obviously multiple-pole devices embodying a greater number of magnets and poles can be made use of where occasion requires.

Figure 8:
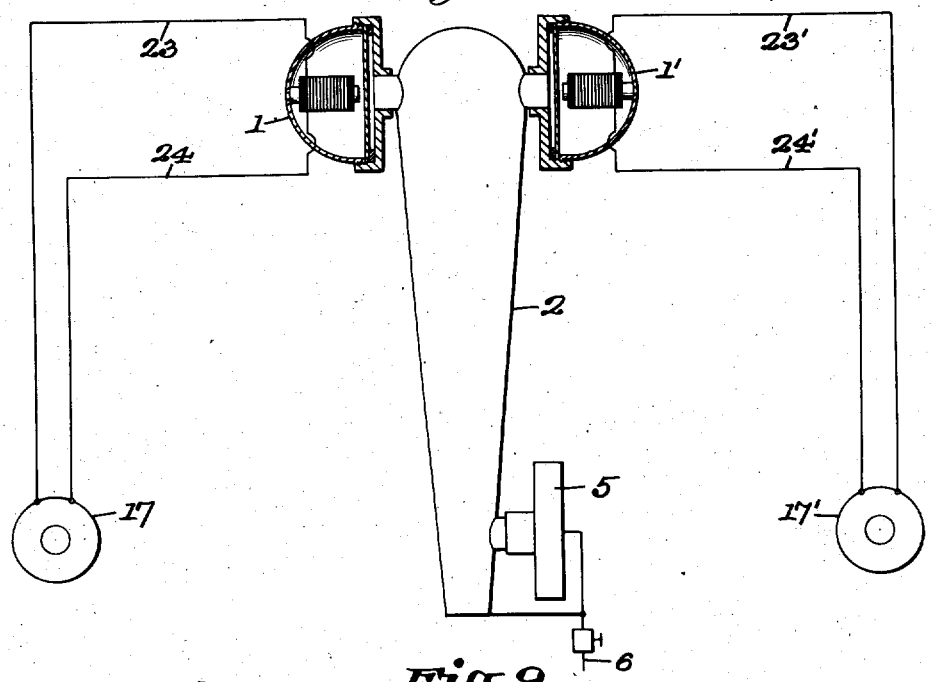
Figure 8 is a view showing two transmitters mounted on the tone arm and two independent local circuits corresponding to the two transmitters.
Figure 9:
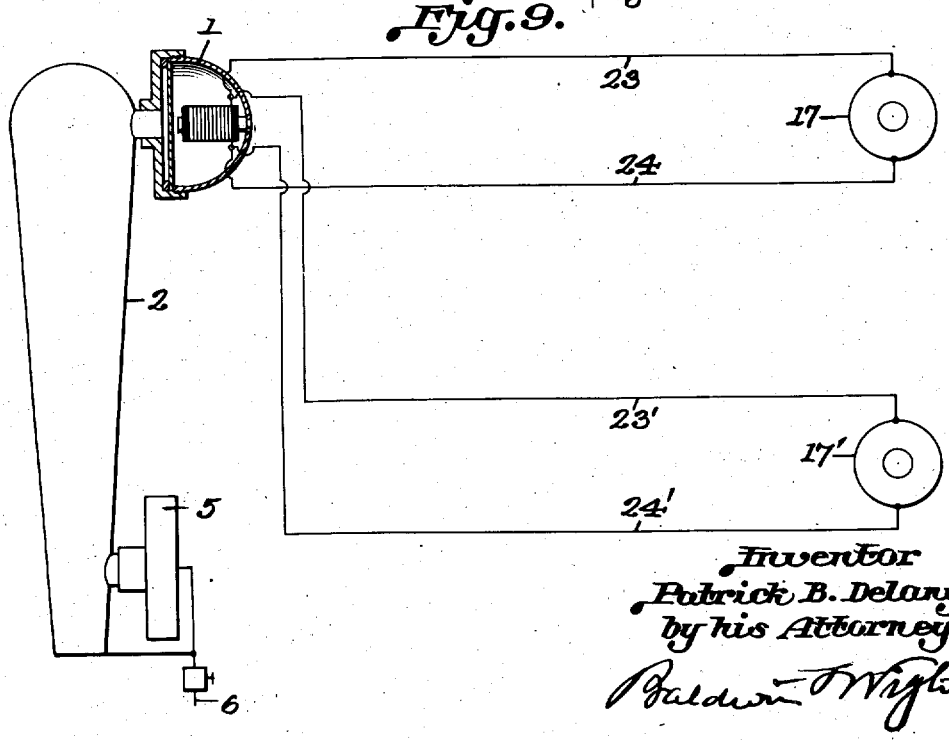
Figure 9 is a view showing an arrangement for securing duplicate reproduction from a single transmitter with a pair of receivers connected in multiple.

In Figure 8 is shown a modification in which two separate transmitters 1 and 1′ are mounted on the tone arm 2. Co-operating with the transmitters 1 and 1′ are the corresponding receivers 17 and 17′ and the connecting circuit wires 23—24 and 23′—24′, respectively. By this arrangement a multiple reproduction can be secured and obviously a still greater number of transmitters with corresponding local circuits and receivers can be employed if desired. In Figure 9 is shown an arrangement for multiple reproduction in which a single transmitter is used in combination with a plurality of receivers 17 and 17′ connected in multiple with the single transmitter.

It will thus be seen that in the described invention provision is made for the refined and accurate reproduction of phonographically produced sounds at a distance, and that a system of multiple production has been provided by means of which two or more persons outside the immediate vicinity of the phonograph can have the benefit of the reproduction. I am aware that a plurality of telephone transmitters have heretofore been mounted on a single tone arm, but such transmitters have not only been of the carbon microphone type and so mounted as to require special means other than the vibrating air column in the tone arm for their actuation but, in addition, they have not been used to control a plurality of telephone receivers at a distance.

It will be observed that the opening or orifice 13 in the tone arm by which communication is established between the interior of the tone arm and the telephone transmitter is of restricted area and that the diaphragm of the transmitter is so mounted that its central portion is in position to be affected by sound waves emanating from the tone arm through such restricted orifice.

As shown the transmitter is located on the side wall of the tone arm as better results are thus obtained than if located in the direct path of the wave vibrations.

It will also be observed that in the preferred construction the transmitter is located at the outer end of the tone arm and is not directly opposite the sound box.

While as before stated superior results are obtained when a magneto transmitter is employed so far as some features of construction herein shown and described are concerned a microphonic transmitter might be used.

In the claims where I specify a tubular sound directing member I refer to a tone arm of usual construction and not to a conduit of indefinite length.

I claim as my invention:

1. A sound reproducing device comprising: a sound reproducing instrument having a tubular sound wave directing member, a telephone transmitter of the current-generating type mounted on the side of said tubular member in position to be actuated by sound wave disturbances within said member, and a telephone circuit within which said transmitter is included.

2. A sound reproducing device comprising: a sound reproducing instrument having a tone arm, a telephone transmitter of the magneto type mounted on the side of said arm and having its diaphragm in communication with the interior of said arm, and a telephone circuit within which said transmitter is included.

3. A sound reproducing device comprising: a sound reproducing instrument having a tone arm, a telephone transmitter of the magneto type mounted on the side wall of said arm with its diaphragm in communication with the interior of said arm, and a telephone circuit within which said transmitter is included.

4. A sound reproducing device comprising: a sound reproducing instrument having a tone arm, a plurality of telephone transmitters of the magneto type mounted on the side wall of said arm in oppositely disposed positions and with their diaphragms in communication with the interior of said arm, a circuit within which said transmitters are connected in parallel, and a telephone receiver in said circuit.

5. A sound reproducing device comprising: a sound reproducing instrument having a tubular sound directing member provided with an orifice of restricted size in the side wall thereof, and a telephone transmitter of the magneto type mounted on said tubular member with the central portion of its diaphragm in position to be affected by sound vibrations emanating from the interior of said tubular directing member through said restricted orifice.

6. A sound reproducing device comprising: a sound reproducing instrument having a tubular sound directing member provided with oppositely disposed orifices of restricted size in the side wall thereof, and telephone transmitters of the magneto type mounted on said tubular member with the central portions of the diaphragms thereof in position to be affected by sound waves emanating from the interior of said tubular directing member through said restricted orifices.

7. A device for electrical transmission of sound comprising: a sound reproducing instrument, a tubular amplifying member for locally directing and distributing sounds produced by said instrument, a magneto telephone transmitter having its diaphragm exposed to sound waves in said tubular member intermediate the ends thereof, and a telephone circuit including said transmitter for electrically reproducing the sounds at a distance.

8. A device for the electrical transmission of sound comprising: a sound reproducing instrument, a tubular member for locally directing and distributing sounds produced by said instrument, a magneto telephone transmitter having its diaphragm mounted substantially parallel to the axis of said tubular member and exposed to sound waves in said member intermediate the ends thereof, and a telephone circuit including said transmitter for electrically reproducing the sounds at a distance.

In testimony whereof I have hereunto subscribed my name.

PATRICK B. DELANY.